(12) United States Patent
Terseteeg

(10) Patent No.: US 8,137,804 B2
(45) Date of Patent: Mar. 20, 2012

(54) EPOXY-BASED ELECTROCOATING COMPOSITION

(75) Inventor: Jill E. Terseteeg, Columbia Heights, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 877 days.

(21) Appl. No.: 12/080,696

(22) Filed: Apr. 4, 2008

(65) Prior Publication Data

US 2008/0254284 A1  Oct. 16, 2008

Related U.S. Application Data

(60) Provisional application No. 60/923,396, filed on Apr. 13, 2007.

(51) Int. Cl.
*B32B 27/32* (2006.01)
*B32B 5/16* (2006.01)
*B32B 27/00* (2006.01)
*C25D 1/12* (2006.01)

(52) U.S. Cl. ........ 428/329; 428/220; 428/332; 428/500; 204/471

(58) Field of Classification Search .................. None
See application file for complete search history.

(56) References Cited

U.S. PATENT DOCUMENTS

| | | |
|---|---|---|
| 3,945,893 A | 3/1976 | Ishimori et al. |
| 4,105,464 A | 8/1978 | Osswald et al. |
| 4,511,692 A | 4/1985 | Anderson et al. |
| 5,055,346 A | 10/1991 | Rohrbacher |
| 5,084,542 A | 1/1992 | Arduengo, III et al. |
| 5,102,746 A * | 4/1992 | Shindou et al. ............... 428/623 |
| 5,264,469 A | 11/1993 | Mysliwczyk et al. |
| 5,389,140 A | 2/1995 | Yasuoka et al. |
| 5,407,976 A | 4/1995 | Uhlianuk |
| 5,490,893 A | 2/1996 | Enlow et al. |
| 5,635,049 A | 6/1997 | Mysliwczyk et al. |
| 5,662,977 A | 9/1997 | Spain et al. |
| 5,804,051 A | 9/1998 | Boyd et al. |
| 6,087,417 A | 7/2000 | Stevenson et al. |
| 6,156,823 A | 12/2000 | Sikora |
| 6,211,303 B1 | 4/2001 | Hohner |
| 6,300,428 B1 | 10/2001 | Stevenson et al. |
| 6,436,159 B1 | 8/2002 | Safta et al. |
| 6,562,474 B1 * | 5/2003 | Yoshimi et al. ............ 428/472.3 |
| 6,592,977 B2 | 7/2003 | Thomas et al. |
| 6,803,408 B2 | 10/2004 | Anderson et al. |
| 6,916,368 B2 | 7/2005 | Vanier et al. |
| 6,956,079 B2 | 10/2005 | Scarlette |
| 6,969,754 B2 | 11/2005 | Garner et al. |
| 7,063,735 B2 | 6/2006 | Fristad et al. |
| 7,182,987 B2 | 2/2007 | Matthijs et al. |
| 2006/0024511 A1 * | 2/2006 | Elmer et al. .................. 428/447 |
| 2006/0172064 A1 | 8/2006 | Kolberg et al. |
| 2006/0204746 A1 | 9/2006 | Li et al. |

FOREIGN PATENT DOCUMENTS

| | | |
|---|---|---|
| JP | 2001329221 | 11/2001 |
| WO | WO 2005/014894 A1 | 2/2005 |

* cited by examiner

*Primary Examiner* — Sheeba Ahmed
(74) *Attorney, Agent, or Firm* — Valspar Sourcing, Inc.

(57) ABSTRACT

An electrocoating composition and a coating formed from the composition, where the electrocoating composition comprises an epoxy-functional compound, an isocyanate-functional compound, a polyethylene wax, and aluminum oxide.

15 Claims, 1 Drawing Sheet

EPOXY-BASED ELECTROCOATING COMPOSITION

CROSS-REFERENCE TO RELATED APPLICATION(S)

This application claims priority to U.S. Provisional Application No. 60/923,396, filed on Apr. 13, 2007, and entitled "Epoxy-Based Electrocoating Composition", the disclosure of which is incorporated by reference in its entirety.

BACKGROUND

The present invention relates to compositions for forming protective coatings. In particular, the present invention relates to compositions for forming abrasion-resistant coatings with electrocoating processes.

Coatings are typically applied to substrates to provide protective and/or decorative qualities. One effective technique for applying coatings includes an electrocoating process, which typically involves depositing a composition onto an electrically conductive substrate with an applied electrical potential. Early attempts at commercial electrocoating processes used anionic electrocoating processes, where the substrate being coated served as the anode. However, cathodic or cationic electrocoating processes have become increasingly popular, and today, are the most prevalent methods of electrocoating.

One desired property of coatings, whether they be applied for a decorative or a protective function, is abrasion resistance. This is particularly important for coating compositions applied to surfaces that are subjected to abrasive contacts with other objects, such as flooring, shelving, and the like. The use of coatings exhibiting good abrasion resistance on such surfaces prolongs both the appearance and the functionality of the coating compositions. Customers typically require that the coatings be able to withstand substantial levels of abrasion (e.g., at least about 350 cycles of Taber abrasion) before the underlying substrate is exposed. To attain such levels of protection, typical protective coatings formed by electrocoating processes have thick films. However, thick films may substantially increase material costs. Accordingly, there is need for an electrocoating composition that exhibits good abrasion resistance, thereby allowing coatings to be formed with low film thicknesses.

SUMMARY

The present invention relates to an electrocoating composition and a coating formed from the composition. The composition includes an epoxy-functional compound, an isocyanate-functional compound, a polyethylene wax, and aluminum oxide.

DETAILED DESCRIPTION

Figure 1:
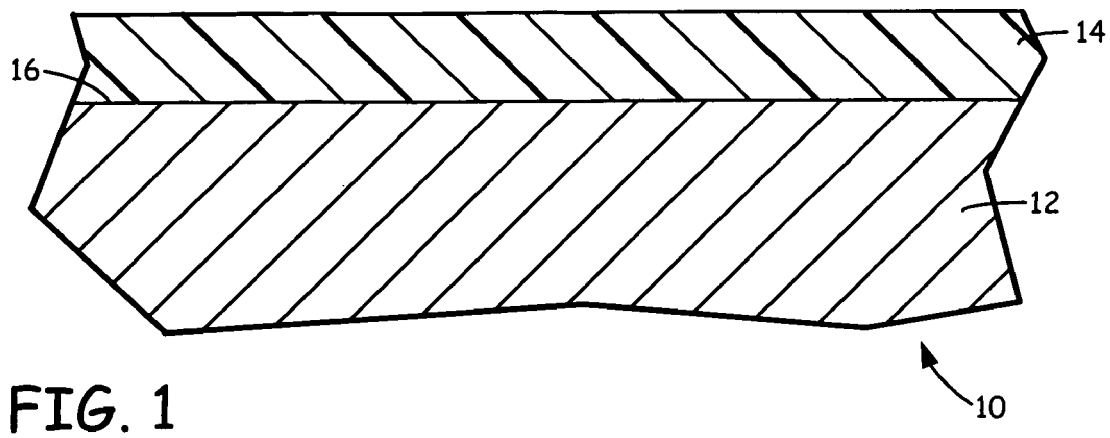
FIG. 1 is a sectional view of a coated article, where the coated article includes a coating formed from an electrocoating composition.

FIG. 1 is a sectional view of one embodiment of coated article 10, which preferably includes substrate 12 and coating 14, where substrate 12 is desirably an electrically-conductive structure that includes surface 16. In this embodiment, coating 14 is a coating formed on surface 16 of substrate 12 from an electrocoating composition to protect substrate 12 from abrasive conditions. The electrocoating composition used to form coating 14 preferably includes an epoxy-functional compound, an isocyanate-functional compound, a polyethylene wax, and aluminum oxide. As discussed below, the electrocoating composition is preferably deposited onto surface 16 of substrate 12 with an electrocoating process, and then at least partially crosslinked to form coating 14. The resulting coating desirably exhibits good abrasion resistance, thereby protecting the underlying substrate 12.

The epoxy-functional compound and the isocyanate-functional compound are preferably the components of the electrocoating composition that crosslink to form coating 14. Examples of suitable compounds for the epoxy-functional compound include monomers, polymers, and copolymers having at least one epoxy moiety per molecule, with particularly suitable compounds including monomers, polymers, and copolymers having at least two epoxy moieties per molecule. The epoxy-functional compound may include molecules that are saturated, unsaturated, branched, unbranched, aliphatic, alicyclic, aromatic, heterocyclic, and combinations thereof. Examples of suitable weight average molecular weights ($M_w$) for the epoxy-functional compound range from about 200 to about 5,000, with particularly suitable weight average molecular weights ranging from about 300 to about 2,000.

In one embodiment, the epoxy-functional compound is a polyglycidyl ether of one or more polyhydric alcohols, where the polyhydric alcohols may also function as chain extenders to modify the molecular weights of the epoxy-functional compound molecules (e.g., via hydroxyl-epoxy reactions). Preferably, the epoxy-functional compound is a polyglycidyl ether of one or more cyclic polyhydric alcohols, such as polyhydric phenols, alicyclic polyhydric alcohols, aliphatic polyhydric alcohols, and combinations thereof. For example, the epoxy-functional compound may be a polyglycidyl ether of one or more polyhydric phenols by etherification of the polyhydric phenols with epihalohydrin (e.g., epichlorohydrin) or dihalohydrin (e.g., dichlorohydrin) in the presence of an alkali. Examples of suitable polyhydric phenols for forming the epoxy-functional compound include 2,2-bis-(4-hydroxyphenyl)ethane; 4,4-dihydroxy-2,2-diphenylpropane (i.e., Bisphenol A); 2-methyl-1,1-bis-(4-hydroxyphenyl)-propane; 2,2-bis-(4-hydroxy-3-tertiarybutylphenyl)-propane, 1,1-bis-(4-hydroxyphenol)ethane; bis-(2-hydroxynaphthyl)methane; 1,5-dihydroxy-3-naphthalenel; and combinations thereof.

Examples of suitable alicyclic polyhydric alcohols for forming the epoxy-functional compound include 1,2-cyclohexane diol; 1,4-cyclohexane diol; 1,2-bis-(hydroxymethyl) cyclohexane; 1,3-bis-(hydroxymethyl)cyclohexane; and combinations thereof. Examples of suitable aliphatic polyhydric alcohols for forming the epoxy-functional compound include polyols such as ethylene glycols, propylene glycols, 1,3-propanediol, glycerols, diethylene glycols, dipropylene glycols, triethylene glycols, trimethylolpropanes, trimethylolethanes, tripropylene glycols, neopentyl glycols, pentaerythritols, 1,4-butanediol, trimethylol propanes, hexylene glycols, and combinations thereof.

The molecules of the epoxy-functional compound may also include substituents such as halogen groups, hydroxyl moieties, ether groups, and cationic salt moieties. In one embodiment, the epoxy-functional compound may include one or more amine-based cationic salt moieties derived by reacting the epoxy polymers with amine compounds. Examples of suitable amine compounds for forming the amine-based cationic salt moieties include primary amines, secondary amines, tertiary amines, and combinations thereof. Primary amines and secondary amines can be acidified after reaction with the epoxy moieties to form amine salt moieties. Tertiary amines can be acidified prior to reaction with the epoxy moieties and, after reaction with the epoxy moieties, form quaternary ammonium salt moieties. The amine-based cationic salt moieties are beneficial for increasing the crosslinking density when reacted with the isocyanate-functional compound.

In one embodiment, the amine compounds may be hydroxyl-containing amines. Examples of suitable hydroxyl-containing amines include alkanol amines, dialkanol amines, trialkanol amines, alkyl alkanol amines, arylalkanol amines, arylalkylalkanolamines, and combinations thereof. Specific examples of suitable hydroxyl-containing amines include ethanolamine, N-methylethanolamine, diethanolamine, N-phenylethanolamine, N,N-dimethylethanolamine, N-methyldiethanolamine, triethanolamine, and N-(2-hydroxyethyl)-piperazine.

The isocyanate-functional compound preferably functions as a crosslinking agent with the epoxy-functional compound. Examples of suitable compounds for the isocyanate-functional compound include aliphatic isocyanates, cycloaliphatic isocyanates, aromatic isocyanates, and combinations thereof. The isocyanate-functional may include one or more isocyanate moieties, and preferably includes two or more isocyanate moieties (e.g., diisocyanates). Examples of specific suitable compounds for the isocyanate-functional compound include tetramethylene diisocyanates, hexamethylene diisocyanates, cyclohexamethylene methylene cyclohexyl isocyanates, isophorone diisocyanates, diisocyanates, toluene diisocyanates, methylene diphenyl diisocyanates, methylene diphenyl diisocyanates, phenylene diisocyanates, and combinations thereof.

In one embodiment, the isocyanate-functional compound may be at least partially blocked with a blocking agent. Preferably, the isocyanate-functional compound is fully blocked with a blocking agent such that substantially no free isocyanate moieties are available until exposed to high temperatures during a curing process. Examples of suitable blocking agents include aliphatic alcohols (e.g., methanol, ethanol, and n-butanol), cycloaliphatic alcohols (e.g., cyclohexanol), aromatic-alkyl alcohols (e.g., phenyl carbinol and methylphenyl carbinol), glycol ethers (e.g., ethylene glycol butyl ether, diethylene glycol butyl ether, ethylene glycol methyl ether, and propylene glycol methyl ether), oximes (e.g., methyl ethyl ketoxime, acetone oxime, and cyclohexanone oxime), lactams (e.g., epsilon-caprolactam), and combinations thereof.

Suitable combined concentrations of the epoxy-functional compound and the isocyanate-functional compound in the electrocoating composition range from about 50% by weight to about 90% by weight, with particularly suitable combined concentrations ranging from about 70% by weight to about 80% by weight, based on the total solids weight of the electrocoating composition. As used herein, the term "total solids weight" refers to the total weight of the non-aqueous or solvent-based components (e.g., water). Suitable concentrations of the isocyanate-functional compound may be based on the ratio of isocyanate moieties of the isocyanate-functional compound to epoxy moieties of the epoxy-functional compound. Examples of suitable ratios range from about 0.5 equivalents of the isocyanate moiety per equivalent of epoxy moiety to about 5 equivalents of the isocyanate moiety per equivalent of epoxy moiety, with particularly suitable ratios ranging from about 1 equivalent of the isocyanate moiety per equivalent of epoxy moiety to about 3 equivalents of the isocyanate moiety per equivalent of epoxy moiety.

In one embodiment, the epoxy-functional compound and the isocyanate-functional compound may be provided as a pre-combined resin. Examples of suitable pre-combined resins of epoxy-functional compounds and isocyanate-functional compounds include resins commercially available under the trademarks "VECTROGARD® 800" and "VECTROGARD®850" epoxy resins from Valspar Corporation, Minneapolis, Minn., where the latter is a cathodic epoxy resin mixture of amino-extended Bisphenol A epoxy resins and an alcohol blocked aromatic urethane crosslinker.

In one embodiment, the electrocoating composition also preferably includes a catalyst to assist the crosslinking of the epoxy-functional compound and the isocyanate-functional compound. Examples of suitable catalysts for use in the electrocoating composition include metal catalysts, such as tin-containing compounds (e.g., dioctyltin oxide and dibutyltin oxide), lead-containing compounds (e.g., lead silicate, lead cyanamide, lead oxide, and lead salts), and combinations thereof. Suitable concentrations of the catalyst in the electrocoating composition range from about 0.1% by weight to about 5.0% by weight, with particularly suitable concentrations ranging from about 0.5% by weight to about 1.0% by weight, based on the total solids weight of the electrocoating composition.

As discussed above, the electrocoating composition also preferably includes a polyethylene wax and aluminum oxide. The polyethylene wax and aluminum oxide desirably provide good abrasion resistance for coating 14, thereby preferably allowing the coating to be formed with low film thicknesses. The polyethylene wax desirably promotes abrasion resistance by reducing the surface energy of coating 14. Examples of suitable materials for the polyethylene wax include branched and un-branched, low-molecular weight polyethylenes. Suitable weight average molecular weights for the polyethylene wax include molecular weights less than about 9,000, which is about the molecular weight of "plastic" polyethylene. Particularly suitable weight average molecular weights for the polyethylene wax range from about 1,000 to about 6,000, with even more particularly suitable weight average molecular weights range from about 1,000 to about 4,000. Suitable melting point temperatures for the polyethylene wax include temperatures of about 140° C. or less, with particularly suitable melting point temperatures including about 100° C. or less.

An example of a suitable polyethylene wax for use in the electrocoating composition includes a polyethylene wax alloy commercially available under the trade designation "S-381 N1" micronized PE wax alloy from Shamrock Technologies, Inc., Newark, N.J. Suitable concentrations of the polyethylene wax in the electrocoating composition range from about 0.1% by weight to about 5.0% by weight, with particularly suitable concentrations ranging from about 0.5% by weight to about 1.0% by weight, based on the total solids weight of the electrocoating composition.

The aluminum oxide (e.g., $Al_2O_3$) desirably increases the physical strength of the coating, thereby preferably providing abrasion resistance properties to coating 14. Examples of suitable aluminum oxides for use in the electrocoating composition include those commercially available under the trade designation "Aluminum Oxide White" from Agsco Corporation, Wheeling, Ill. Suitable average particle sizes for the aluminum oxide range from about 10 micrometers to about 1,200 micrometers. The average particle size of the aluminum oxide may also be reduced during the preparation of the electrocoating composition, due to grounding, milling, and mixing. Suitable concentrations of the aluminum oxide in the electrocoating composition range from about 1.0% by weight to about 10.0% by weight, with particularly suitable concentrations ranging from about 2.0% by weight to about 5.0% by weight, based on the total solids weight of the electrocoating composition.

In various embodiments, the electrocoating compositions may also include one or more additional components, such as film-forming agents, surfactants, wetting agents, defoaming agents, rheology-modifying agents, colorants (e.g., pigments and dyes), and combinations thereof. Film-forming agents are desirably used to assist in building coating 14 during an electrocoating process. Examples of suitable film-forming agents includes reaction products of methylphenol and propylene oxide, such as those commercially available under the trademark "PARAPLEX®" from Rohm and Haas Company, North Olmsted, Ohio. Suitable concentrations of film-forming agents in the electrocoating composition range from about 0.1% by weight to about 3.0% by weight, with particularly suitable concentrations ranging from about 0.5% by weight to about 1.0% by weight, based on the total solids weight of the electrocoating composition.

Examples of suitable surfactants and wetting agents include alkyl imidazolines, such as those commercially available under the trademark "GEIGY AMINE C®" surfactants from Ciba Specialty Chemicals, Basel, Switzerland; acetylenic alcohols, such as those commercially available under the trademark "SURFYNOL®" surfactants from Air Products and Chemicals, Inc., Allentown, Pa., and under the trademark "ENVIROGEM® AD01" surfactants from Air Products and Chemicals, Inc., Allentown, Pa.; alkyl ester-based surfactants, such as those commercially available under the trademark "ENVIROGEM® AE" surfactants from Air Products and Chemicals, Inc., Allentown, Pa.; and combinations thereof. Examples of suitable defoaming agents include the above-discussed surfactants and wetting agents, polysiloxane defoamers (e.g., methylalkylpolysiloxanes), and combinations thereof. Suitable concentrations of surfactants, wetting agents, and defoaming agents in the electrocoating composition range from about 0.1% by weight to about 2.0% by weight, with particularly suitable concentrations ranging from about 0.1% by weight to about 0.5% by weight, based on the total solids weight of the electrocoating composition.

Examples of suitable rheology-modifying agents include thixiotropic materials and fillers. Examples of suitable thixiotropic materials include polyamides, oxidized polyethylenes, and combinations thereof. Examples of suitable commercially available thixiotropic materials include those under the series "DISPARLON®" from King Industries, Inc., Norwalk, Conn. Examples of suitable fillers include silicon dioxides, talc, woolastonites, mica, alumina trihydrates, clays, silica quartz, calcium carbonates, magnesium carbonates, barium carbonates, calcium sulfates, magnesium sulfates, and combinations thereof. Examples of suitable commercially available fillers include silicon dioxides under the trademark "AEROSIL®" fumed silicas from Degussa GmbH, Frankfurt, Germany; and silica quartz fillers under the series "BENTONE®" from Elementis-Specialties, Inc., Hightstown, N.J. Suitable concentrations of rheology-modifying agents in the electrocoating composition range from about 0.01% by weight to about 0.20% by weight, with particularly suitable concentrations ranging from about 0.01% by weight to about 0.1% by weight, based on the total solids weight of the electrocoating composition.

Examples of suitable colorants for use in the electrocoating composition include pigments, such as iron oxides, lead oxides, zinc oxides, strontium chromate, copper chromium, carbon black, coal dust, titanium dioxide, lead silicate, barium sulfate, and combinations thereof. Examples of commercially available carbon black pigments include those under the trademark "PRINTEX®" carbon black from Degussa GmbH, Frankfurt, Germany. In one embodiment, the electrocoating composition may also include one or more flattener pigments, such as those commercially available under the trademark "AUSTIN BLACK®" ground coal fillers from Coal Fillers Incorporated, Bluefield, Va. Suitable concentrations of pigments and other colorants (e.g., dyes) in the electrocoating composition range from about 1.0% by weight to about 10.0% by weight, with particularly suitable concentrations ranging from about 2.0% by weight to about 5.0% by weight, based on the total solids weight of the electrocoating composition. The electrocoating composition may also include one or more monomeric or polymeric compounds, such as acrylic resins, to modify the color of the resulting coating.

Figure 2:
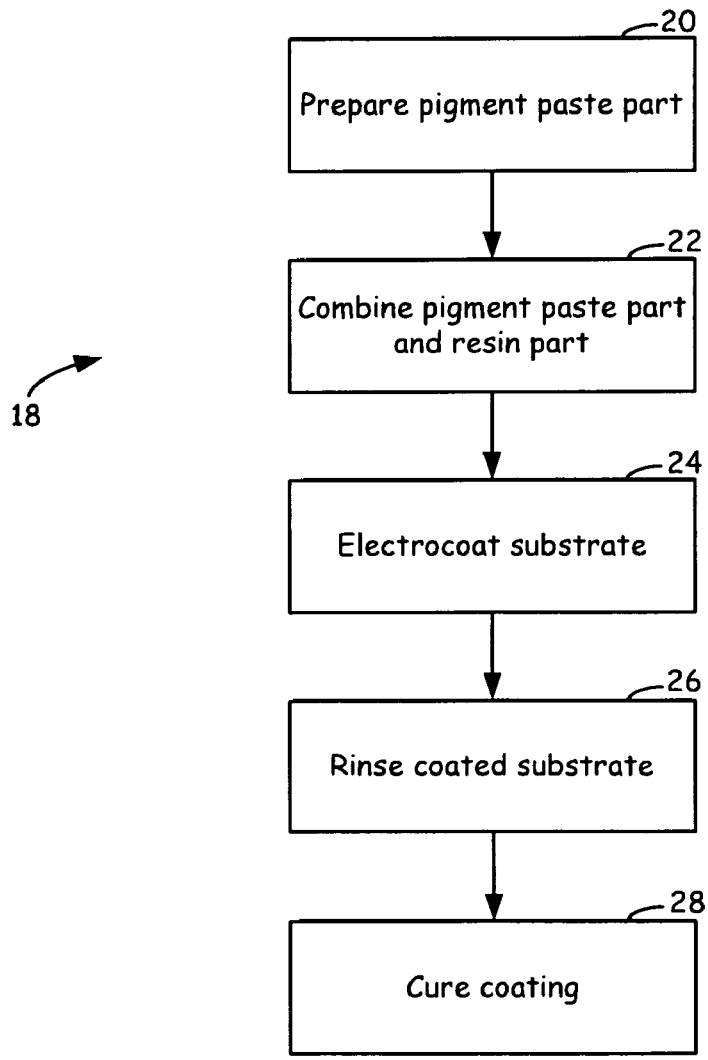
FIG. 2 is a flow diagram of a method for forming a coated article with an electrocoating composition via a cathodic electrocoating process.

FIG. 2 is a flow diagram of method 18, which is a suitable method for forming a coated article (e.g., coated article 10 shown in FIG. 1) with the electrocoating composition via a cathodic electrocoating process. In this embodiment, the electrocoating composition may be provided as a two-part system, which preferably includes a pigment paste part and a resin part. Accordingly, method 18 includes steps 20-28, and may initially involve forming a pigment paste part of the electrocoating composition (step 20). The pigment paste part desirably includes the polyethylene wax, the aluminum oxide, and the catalyst, and may also include any of the above-discussed additional components (e.g., surfactants and pigments). The pigment paste part may also include a portion of the epoxy-functional compound and the isocyanate-functional compound, which desirably assists in dispersing the components of the pigment paste part (e.g., the polyethylene wax, the aluminum oxide, and the pigments).

In one embodiment, the electrocoating composition may also include one or more acid compounds, which may be beneficial for further neutralizing the epoxy-functional compound. In one embodiment, the epoxy-functional compound may be at least about 35% neutralized, with particularly suitable levels of neutralization ranging from about 35% to about 60%. The neutralization of the epoxy-functional compound renders the epoxy-functional compound cationic and water dispersible. Examples of suitable acid compounds include organic and inorganic acids such as formic acid, acetic acid, lactic acid, phosphoric acid, sulfamic acid, sulfonic acids, and combinations thereof. Suitable concentrations of the acid compound in the electrocoating composition range from about 0.1% by weight to about 2.0% by weight, with particularly suitable concentrations ranging from about 0.2% by weight to about 1.0% by weight, based on the total solids weight of the electrocoating composition.

The pigment paste part may be prepared by mixing the components (e.g., the polyethylene wax, the aluminum oxide, and the catalyst) together to form a paste. The pigment paste part may also include water to assist in the mixing of the components. The components may be mixed together with a variety of mixing systems, such as media mills and high-speed dispersers. The mixing desirably continues at least until the components are well mixed, thereby dispersing the polyethylene wax and aluminum oxide through the pigment paste part. In one embodiment, the pigment paste part may be prepared by forming an intermediary catalyst paste and an intermediary grind paste, as discussed below in the Examples section.

The pigment paste part and the resin part may then be combined to form the electrocoating composition (step 22). The resin part desirably includes at least a portion of the crosslinkable components of the electrocoating composition, such as the epoxy-functional compound and the isocyanate-functional compound. In one embodiment, the resin part may also include one or more of the above-discussed additional components. The pigment paste part and the resin part are desirably combined in a reaction vessel containing an aqueous medium (e.g., deionized water). This desirably allows the pigment paste part and the resin part to mix and become suspended (e.g., dispersed, solubilized, and/or emulsified) in the aqueous medium.

As discussed above, the pigment paste part may include an acid component that desirably neutralizes the epoxy-functional compound provided from the resin part and/or the pigment paste part, thereby desirably rendering the epoxy-functional compound water soluble. As such, the electrocoating composition may be dispersed in the aqueous medium to desirably form a stable aqueous dispersion in the aqueous medium. As used herein, the term "stable aqueous dispersion" refers to a dispersion that does not settle out of the aqueous medium for a duration of at least 30 minutes without agitation. The dispersion is also desirably redispersible with the use of mild agitation. In one embodiment, the electrocoating composition may be capable of forming stable aqueous dispersion in an aqueous medium at a total solids concentration of about 20% by weight or less, based on an entire weight of the aqueous dispersion. An aqueous dispersion is beneficial in an electrocoating process for allowing the electrocoating composition to migrate toward a cathodic substrate when an electrical potential is induced through the aqueous dispersion.

Suitable feed ratios by weight of the pigment paste part, the resin part, and the aqueous medium range from about 1:2:10 (i.e., 1 pigment paste part, 2 resin parts, 10 aqueous medium parts, by weight) to about 1:5:20. Suitable solid ratios in the aqueous dispersion range from about 5% by weight to about 20% by weight, with particularly solid ratios in the dispersion ranging from about 8% by weight to about 15% by weight. The aqueous dispersion may be kept under agitation in the reaction vessel to reduce the risk of settling, and may also be maintained at an elevated temperature to assist the electrocoating process. Examples of suitable elevated temperatures range from about 27° C. (80° F.) to about 43° C. (110° F.), with particularly suitable elevated temperatures ranging from about 32° C. (90° F.) to about 35° C. (95° F.).

A substrate (e.g., substrate 12 shown in FIG. 1) may then be subjected to an electrocoating process in the reaction vessel to form a coating (e.g., coating 14 shown in FIG. 1) on the substrate (step 24). This may involve placing an electrically conductive anode in contact with the aqueous dispersion. The substrate may then be immersed in the aqueous dispersion and connected to an electrically conductive carrier, thereby allowing the substrate to function as a cathode. An electrical potential may then be induced through the aqueous dispersion and the substrate, thereby depositing the electrocoating composition onto the substrate. The electrocoating process may be performed for a duration sufficient to build a coating of the electrocoating composition to a desired thickness on the substrate. The thickness of the coating may depend on a variety of factors, such as the composition of the electrocoating composition, the solids concentration of the aqueous dispersion, the surface area of the substrate, and the intensity of the electrical potential. Examples of suitable electrical potentials range from about 50 volts to about 500 volts, with particularly suitable electrical potentials ranging from about 100 volts to about 350 volts.

After the electrocoating process, the coated substrate may be rinsed to desirably remove any non-bonded portions of the electrocoating composition (step 26). Examples of suitable rinsing fluids include deionized water and/or a permeate filtered from the reaction vessel, which may include water, acid, solvent, ions, and low molecular weight resins. The coated substrate may then be heated to cure the coating (step 28). In one embodiment, the coated substrate may be placed in an oven maintained at an elevated temperature for a sufficient duration to cure the coating. The temperature is preferably high enough to remove the blocking agent from the isocyanate-functional compound, thereby allowing the epoxy-functional compound to crosslink with the isocyanate-functional compound. Examples of suitable temperatures for curing the electrocoating composition range from about 150° C. (about 300° F.) to about 200° C. (about 400° F.), with particularly suitable temperatures ranging from about 175° C. (about 350° F.) to about 190° C. (about 380° F.). Examples of suitable durations for substantially curing the coating at the suitable and particularly suitable temperatures range from about 10 minutes to about 60 minutes, with particularly suitable durations ranging from about 15 minutes to about 30 minutes.

In one embodiment, the electrocoating process may be performed in a continuous manner, where successive portions of the substrate may be run into, and out from, the reaction vessel during the electrocoating process. In this embodiment, the pigment paste part, the resin part, and the aqueous medium may be continuously or intermittently charged to the reaction vessel to maintain a desired concentration ratio. The successive portions of the substrate preferably have sufficient dwell times in the reaction vessel to form coatings having desired thicknesses. Examples of suitable dwell times for continuous electrocoating processes using the above-discussed operating conditions range from about 60 seconds to about 180 seconds, with particularly suitable dwell times ranging from about 90 seconds to about 120 seconds. Furthermore, the rinsing and curing steps may also be performed in a continuous manner in a single assembly line, thereby reducing the time to form the coated articles.

The resulting coated article (e.g., coated article 10) desirably includes a coating (e.g, coating 14) that provides abrasion protection to the substrate (e.g., substrate 12). As discussed above, the polyethylene wax and aluminum oxide desirably increase the abrasion resistance of the coating. Customers typically require that a protective coating be able to withstand at least about 350 cycles of Taber abrasion before the underlying substrate is exposed. The coating formed with the electrocoating composition containing the polyethylene wax and the aluminum oxide is capable of withstanding more than twice this level of Taber abrasion with low film thicknesses. Examples of suitable film thicknesses for the coating (e.g., coating 14) include thicknesses of at least about 7.6 micrometers (0.3 mils), with particularly suitable thicknesses ranging from about 7.6 micrometers (0.3 mils) to about 25.4 micrometers (1.0 mil), and with even more particularly suitable thicknesses ranging from about 7.6 micrometers (0.3 mils) to about 10.2 micrometers (0.4 mils).

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques. The following compositional abbreviations are used in the following Examples:

"Epoxy resin": A cathodic epoxy resin mixture of amino-extended Bisphenol A epoxy resins and an alcohol blocked aromatic urethane crosslinker, which is commercially available under the trademark "VECTROGARD®850" epoxy resin from Valspar Corporation, Minneapolis, Minn.;

"Epoxy salt": An amino-extended Bisphenol A epoxy resin, which is available from Valspar Corporation, Minneapolis, Minn.;

"PE wax": A micronized polyethylene wax alloy commercially available under the trade designation "S-381 N1" micronized PE wax alloy from Shamrock Technologies, Inc., Newark, N.J.;

"Aluminum oxide": Aluminum oxide ($Al_2O_3$) particulates commercially available under the trade designation "Aluminum Oxide white #1200 grit" from Agsco Corporation, Wheeling, Ill.;

"Tin catalyst": A dibutyltin oxide catalyst commercially available under the trademark "FASCAT®4203" catalyst from Arkema, Inc., Philadelphia, Pa.;

"Film-forming agent": A reaction product of methylphenol and propylene oxide, which functions as a film-forming agent, and is commercially available under the trademark "PARAPLEX® WP-1" from Rohm and Haas Company, North Olmsted, Ohio;

"104-A surfactant": A wetting agent surfactant commercially available under the trademark "SURFYNOL® 104-A" surfactant from Air Products and Chemicals, Inc., Allentown, Pa.;

"AD01 surfactant": A wetting agent surfactant commercially available under the trademark "ENVIROGEM® AD01" surfactant from Air Products and Chemicals, Inc., Allentown, Pa.;

"Silicon dioxide": Silicon dioxide ($SiO_2$) particulates commercially available under the trademark "AEROSIL® R-972" silicon dioxide from Degussa GmbH, Frankfurt, Germany;

"Flattener pigment": A flattener pigment commercially available under the trademark "AUSTIN BLACK® 325" ground coal filler from Coal Fillers Incorporated, Bluefield. VA;

"Carbon black": A carbon black pigment commercially available under the trademark "PRINTEX®200" carbon black from Degussa GmbH, Frankfurt, Germany;

"Acrylic resin": An acrylic resin for modifying the color of the coating, which is commercially available from Valspar Corporation, Minneapolis, Minn.

"Acetic acid": Glacial acetic acid ($CH_3COOH$) commercially available from Ashland, Inc., Willow Springs, Ill.; and "Phosphoric acid": Phosphoric acid ($H_3PO_4$) commercially available from Ashland, Inc., Willow Springs, Ill.

Coated articles of Example 1 and Comparative Example A were each prepared by forming coatings on steel substrates with electrocoating compositions, and then subjected to a Taber Wear Resistance Test.

Example 1

The electrocoating composition used to form the coated article of Example 1 was prepared as a two-part system that included a pigment paste part and a resin part. The pigment paste part was prepared by initially forming an intermediary catalyst paste. The catalyst paste was formed by combining the epoxy salt, tin catalyst, 104-A surfactant, silicon dioxide, and deionized water at the component concentrations listed in Table 1. The combined components were then put through a media mill until fully mixed.

TABLE 1

| Catalyst Paste Components | Percent by Weight |
| --- | --- |
| Epoxy salt | 40.29 |
| Tin catalyst | 41.36 |
| 104-A surfactant | 2.21 |
| Silicon dioxide | 0.74 |
| Deionized water | 15.40 |

The catalyst paste was then combined with the epoxy resin, the PE wax, the aluminum oxide, the film-forming agent, the AD01 surfactant, the flattener pigment, the carbon black, and acetic acid to form an intermediary grind paste having component concentrations listed below in Table 2. The grind paste was mixed with a high-speed disperser and put through a media mill to disperse the solid materials.

TABLE 2

| Grind Paste Components | Percent by Weight |
| --- | --- |
| Catalyst paste (from Table 1) | 8.30 |
| Epoxy resin | 54.54 |
| PE wax | 3.34 |
| Aluminum oxide | 15.37 |
| Film-forming agent | 4.74 |
| AD01 surfactant | 0.78 |
| Flattener pigment | 8.30 |
| Carbon black | 3.82 |
| Acetic acid | 0.81 |

After the grind paste was prepared, the pigment paste part of the electrocoating composition was prepared by mixing 79.85 grams of the grind paste with 0.60 grams of acetic acid, 0.60 grams of phosphoric acid, and 15.96 grams of deionized water. Table 3 lists the resulting component concentrations of the pigment paste part of the electrocoating composition.

TABLE 3

| Pigment Paste Components | Percent by Weight |
| --- | --- |
| Epoxy resin | 44.89 |
| Epoxy salt | 2.75 |
| PE wax | 2.75 |
| Aluminum oxide | 12.65 |
| Tin catalyst | 2.83 |
| Film-forming agent | 3.90 |
| AD01 surfactant | 0.64 |
| 104-A surfactant | 0.15 |
| Silicon dioxide | 0.05 |
| Flattener pigment | 6.83 |
| Carbon black | 3.14 |
| Acetic acid | 1.29 |
| Phosphoric Acid | 0.62 |
| Deionized water | 17.50 |

The resin part of the electrocoating composition was prepared by combining 4.23 parts by weight of the epoxy resin with one part by weight of the acrylic resin. The acrylic resin was included for modifying the color of the resulting coating. The pigment paste part, the resin part, and deionized water were then charged to a reaction vessel to maintain concentration ratios of about 5 parts by weight pigment paste part, 16 parts by weight resin part, and 79 parts by weight deionized water. This provided an aqueous dispersion of the electrocoating composition having a total solids concentration of about 20% by weight. Table 4 lists the component concentrations of the electrocoating composition, based on a total solids weight.

TABLE 4

| Electrocoating Composition Solids Components | Percent by Weight |
| --- | --- |
| Epoxy resin | 75.61 |
| Epoxy salt | 0.66 |
| PE wax | 0.66 |
| Aluminum oxide | 3.05 |
| Tin catalyst | 0.68 |
| Film-forming agent | 0.94 |
| AD01 surfactant | 0.16 |
| 104-A surfactant | 0.04 |
| Silicon dioxide | 0.01 |
| Flattener pigment | 1.65 |
| Carbon black | 0.76 |
| Acetic acid | 0.31 |
| Phosphoric Acid | 0.15 |
| Acrylic resin | 15.31 |

The aqueous dispersion was maintained at a temperature ranging from 32° C. (90° F.) to 35° C. (95° F.), and was kept under sufficient agitation in the reaction vessel to keep the solids dispersed in the aqueous medium. A cathodic electrocoating process was then performed by placing an electrically conductive anode in contact with the aqueous dispersion. A steel substrate was then immersed in the aqueous dispersion, and was connected to an electrically conductive carrier to function as a cathode. An electric current of 100 volts was then induced through the aqueous dispersion and the steel substrate, thereby depositing the electrocoating composition onto the steel substrate. The electrocoating process was performed for sufficient duration to build a coating of the electrocoating composition to a thickness of 7.6 micrometers (0.3 mils). After completion, the coated substrate was rinsed with deionized water and permeate, and then placed in an oven maintained at 185° C. (365° F.) for 20 minutes to cure the coating. This provided the coated article of Example 1, where the coating included a polyethylene wax and aluminum oxide dispersed within the crosslinked matrix.

Comparative Example A

The electrocoating composition used to form the coated article of Comparative Example A was prepared as a two-part system in a similar manner to that discussed above for the coated article of Example 1. However, the grind paste prepared for the electrocoating composition for Comparative Example A did not include a polyethylene wax or aluminum oxide. Thus, the resulting coating on the substrate for the coated article of Comparative Example A did not include a polyethylene wax or aluminum oxide in the crosslinked matrix.

Taber Wear Resistance Testing of Example 1 and Comparative Example A

The abrasion resistances of the coated articles of Example 1 and Comparative Example A were then each measured by a standard Taber Wear Resistance Test with a Taber Abrasion Machine. For each test, the initial coating thickness of the test specimen was measured in several places to obtain an average coating thickness (i.e., 7.6 micrometers). The test specimen was then mounted on a turntable and the abrading heads of the Taber Abrasion Machine were placed on the test specimen and the test specimen was subjected to abrasion until wear-through occurred. The abrading heads of the Taber Abrasion Machine were CS-10 wheels, where each wheel had a total load weight of 1,000 grams.

The coated article of Example 1 withstood 800 taber cycles before the underlying substrate was exposed. This is more than twice the minimum level of abrasion resistance than desired by customers (i.e., greater than about 350 cycles). The coated article of Comparative Example A withstood only 225 taber cycles before the underlying substrate was exposed. Thus, the electrocoating composition for Example 1 (containing the polyethylene wax and the aluminum oxide) provided exhibited an abrasion resistance more than three times greater than the electrocoating composition for Comparative Example A (without the polyethylene wax and the aluminum oxide). Accordingly, the electrocoating composition including the polyethylene wax and the aluminum oxide was capable of obtaining good abrasion resistance with a low film thickness. As discussed above, this may substantially reduce material costs.

Although the present invention has been described with reference to preferred embodiments, workers skilled in the art will recognize that changes may be made in form and detail without departing from the spirit and scope of the invention.

The invention claimed is:

1. A coated article comprising:
   a substrate; and
   a coating disposed on the substrate, the coating comprising a reaction product of an electrocoating composition comprising an epoxy-functional compound, an isocyanate-functional compound, a polyethylene wax, and aluminum oxide, wherein the coating has a thickness of about 7.6 µm to about 25.4 µm.

2. The coated article of claim 1, wherein the epoxy-functional compound comprises an amine-based cationic salt moiety formed from an amine compound selected from the group consisting of primary amines, secondary amines, tertiary amines, and combinations thereof.

3. The coated article of claim 1, wherein the isocyanate-functional compound comprises a blocked diisocyanate.

4. The coated article of claim 1, wherein the polyethylene wax has a weight average molecular weight ranging from about 1,000 to about 6,000.

5. The coated article of claim 4, wherein the weight average molecular weight of the polyethylene wax ranges from about 1,000 to about 4,000.

6. The coated article of claim 1, wherein the electrocoating composition further comprises a component selected from the group consisting of film-forming agents, surfactants, wetting agents, defoaming agents, rheology-modifying agents, colorants, and combinations thereof.

7. The coated article of claim 1, wherein the thickness of the coating ranges from about 7.6 micrometers to about 10.2 micrometers.

8. The coated article of claim 1, wherein the electrocoating composition is capable of forming a stable aqueous dispersion in an aqueous medium at a total solids concentration of about 20% by weight or less, based on an entire weight of the aqueous dispersion.

9. The coated article of claim 1, wherein the polyethylene wax is present in an amount ranging from about 0.1% by weight to about 5.0% by weight, based on a total solids weight of the electrocoating composition.

10. The coated article of claim 1, wherein the aluminum oxide is present in an amount ranging from about 1.0% by weight to about 10.0% by weight, based on a total solids weight of the electrocoating composition.

11. A method of forming the coated article of claim 1, the method comprising:
  depositing the electrocoating composition onto the substrate with a cathodic electrocoating process; and
  at least partially crosslinking the epoxy-functional compound and the isocyanate-functional compound.

12. The coated article of claim 1, wherein the electrocoating composition comprises:
  a resin part comprising the epoxy-functional compound and the isocyanate-functional compound; and
  a paste part comprising the polyethylene wax, aluminum oxide, a metal catalyst, and an acid configured to at least partially neutralize the epoxy-functional compound, wherein the polyethylene wax has a weight average molecular weight less than about 9000.

13. The coated article of claim 12, wherein the electrocoating composition comprises the epoxy-functional compound and the isocyanate-functional compound in a combined amount ranging from about 50% by weight to about 90% by weight, based on a total solids weight of the composition.

14. The coated article of claim 12, wherein the electrocoating composition comprises a ratio of the paste part to the resin part from about 1:2 to about 1:5.

15. The coated article of claim 12, wherein the paste part further comprises a component selected from the group consisting of film-forming agents, surfactants, wetting agents, defoaming agents, rheology-modifying agents, colorants, and combinations thereof.

* * * * *